US005724027A

United States Patent [19]

Shipman et al.

[11] Patent Number: 5,724,027
[45] Date of Patent: Mar. 3, 1998

[54] METHOD AND APPARATUS FOR PROVIDING SYSTEM SECURITY TO PERSONAL COMPUTER SYSTEMS USING TRANSPARENT SYSTEM INTERRUPT

[75] Inventors: Mark Shipman, Hillsboro; Orville Christeson, Portland, both of Oreg.

[73] Assignee: Intel Corporation, Santa Clara, Calif.

[21] Appl. No.: 535,725

[22] Filed: Sep. 28, 1995

[51] Int. Cl.$^6$ .............................. G06F 3/02; G06F 13/00; H04L 9/32; G06K 5/00
[52] U.S. Cl. .................. 340/825.31; 340/825.34; 380/4; 380/25; 395/200.06; 235/382; 235/382.5
[58] Field of Search ................ 340/825.31, 825.34, 340/34; 380/23, 25, 4; 235/380, 382, 382.5; 395/734, 735, 742, 186, 200.06, 187.01; 364/188, 189

[56] References Cited

U.S. PATENT DOCUMENTS

| | | | |
|---|---|---|---|
| 4,942,606 | 7/1990 | Kaiser et al. | 380/4 |
| 5,097,506 | 3/1992 | Kaiser, Jr. et al. | 380/25 |
| 5,173,490 | 12/1992 | Lantz et al. | 380/25 |
| 5,187,352 | 2/1993 | Blair et al. | 235/382 |
| 5,263,157 | 11/1993 | Janis | 395/600 |
| 5,313,639 | 5/1994 | Chao | 395/725 |
| 5,339,437 | 8/1994 | Yeun | 395/700 |
| 5,355,414 | 10/1994 | Hale et al. | 380/25 |
| 5,377,269 | 12/1994 | Heptig et al. | 380/25 |
| 5,408,536 | 4/1995 | Lemelson | 382/2 |
| 5,465,084 | 11/1995 | Cottrell | 340/825.31 |
| 5,577,209 | 11/1996 | Boyle et al. | 395/200.06 |

*Primary Examiner*—Brian Zimmerman
*Assistant Examiner*—Yonel Beaulieu
*Attorney, Agent, or Firm*—Blakely, Sokoloff, Taylor & Zafman

[57] ABSTRACT

A transparent system management interrupt (SMI) handler equipped with system security functions is provided to a personal computer (PC) for providing system security to the PC. Additionally, the keyboard controlling facility of the PC is enhanced to cooperate with the SMI handler to deliver system security under the direction of the SMI handler. The SMI handler's system security functions include a number of functions for handling a number of security related events detected by the keyboard controlling facility. The keyboard controlling facility is enhanced to operate in one of three modes, a normal mode, a sleuth mode, and a secured mode, under which the keyboard controlling facility allows "unrestricted" keyboard operations, communicates exclusively with the SMI handler, and allows only "restricted" keyboard operations respectively.

25 Claims, 17 Drawing Sheets

Transition from Normal Mode to Sleuth Mode

Transition from Sleuth Mode to Normal Mode

Transition from Secure Mode to Sleuth Mode

METHOD AND APPARATUS FOR PROVIDING SYSTEM SECURITY TO PERSONAL COMPUTER SYSTEMS USING TRANSPARENT SYSTEM INTERRUPT

BACKGROUND OF THE INVENTION

1. Field of the Invention

The present invention relates to the field of computer systems. More specifically, the present invention relates to system security of personal computer systems.

2. Background Information

Historically, when personal computer systems were first introduced, system security or prevention of unauthorized uses of these systems was not a very important issue. Thus, system security approaches are typically simple and unsophisticated, as exemplified by the physical key switch approach which prevents unauthorized usage by disabling the connected keyboard of a personal computer system from being able to provide keyboard inputs to the system.

Over the years, as personal computer systems are increasingly being used for critical or sensitive applications, system security has become a much more important issue. Various hardware, software, or combination approaches with increased capability and/or versatility have been developed in the industry to achieve the desired security. For example, U.S. Pat. No. 4,942,606, discloses a more versatile keyboard/auxiliary device interface controller which supports the selective restriction of user interaction with the computer system, thereby preventing the personal computer system from being used, and yet the full internal functionality of the host/peripheral interface is still maintained, allowing interactions between the CPU and the connected input devices to continue even under the "locked mode". As a further example, U.S. Pat. No. 5,097,506 discloses an even more capable keyboard controller/interface which allows the "locked mode" to be activated through a programmable key sequence entered from the keyboard.

However, both of these approaches and others like them all suffer the disadvantage in that the keyboard controller bears the main burden of supporting the system security feature or capability, resulting in increased cost for the keyboard controller. Furthermore, since most keyboard controllers are implemented with low cost controllers having limited capabilities (due to cost constraints), these and other approaches like them also suffer the disadvantage of being difficult to extend the system security capabilities.

Thus, it is desirable to have a system security approach that is more capable as well as more extensible, without increasing the cost of a keyboard controller. It is even more desirable if the increased capability and extendibility can be achieved with less costly keyboard controllers. As will be disclosed in more detail below, the method and apparatus of the present invention achieves these and other desirable results.

SUMMARY OF THE INVENTION

A transparent system management interrupt (SMI) handler equipped with system security functions is provided to a personal computer (PC) for providing system security to the PC. Additionally, the keyboard controlling facility of the PC is enhanced to cooperate with the SMI handler to deliver system security under the direction of the SMI handler.

The SMI handler's system security functions include a number of functions for handling a number of security related events detected by the keyboard controlling facility. These security related events include the detection of "hot keys" from the keyboard, and the detection of a number of security related commands issued by the processor, while the system is operating in an unsecured manner. These events further include the detection of "unexpected responses" from the keyboard, while the system is operating under the security enforced by the SMI handler in conjunction with the keyboard controlling facility.

The keyboard controlling facility is enhanced to operate in one of three modes, a normal mode, a sleuth mode, and a secured mode. Under the normal mode, the keyboard controlling facility allows commands and data to be freely exchanged between the processor and the keyboard (including any auxiliary device attached to the keyboard) in a substantially unrestricted manner, except for "hot keys" entered by the keyboard, and a number of security related commands issued by the processor. Under the secured mode, the keyboard controlling facility allows commands and data to be exchanged between the processor and the keyboard in a substantially restricted manner, except for certain commands from the processor to the keyboard and the keyboard's "expected responses" to these commands. Under the sleuth mode, the keyboard controlling facility communicates exclusively with the SMI handler to cooperatively service the security related events that caused the keyboard controlling facility to enter the sleuth mode, under the direction of the SMI handler.

The normal mode is the defaulted mode of operation for the keyboard controlling facility. From the normal mode, the keyboard controlling facility transitions to the sleuth mode in response to the "restricted" events. From the sleuth mode, the keyboard controlling facility transitions to either the normal or the secured mode in accordance to the direction of the SMI handler. From the secured mode, the keyboard controlling facility transitions to the sleuth mode in response to the "restricted" events.

As a result, the SMI handler bears the main burden for providing system security, allowing minimal functionality to be required of the keyboard controlling facility, thereby reducing the cost of the keyboard controlling facility. Furthermore, by virtue of the extendibility of the SMI handler, the system security functions may be easily extended.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, in describing various method steps, for ease of explanation, some of the steps are described as multiple steps, however it should not be construed that these steps are necessarily order dependent.

Figure 1:
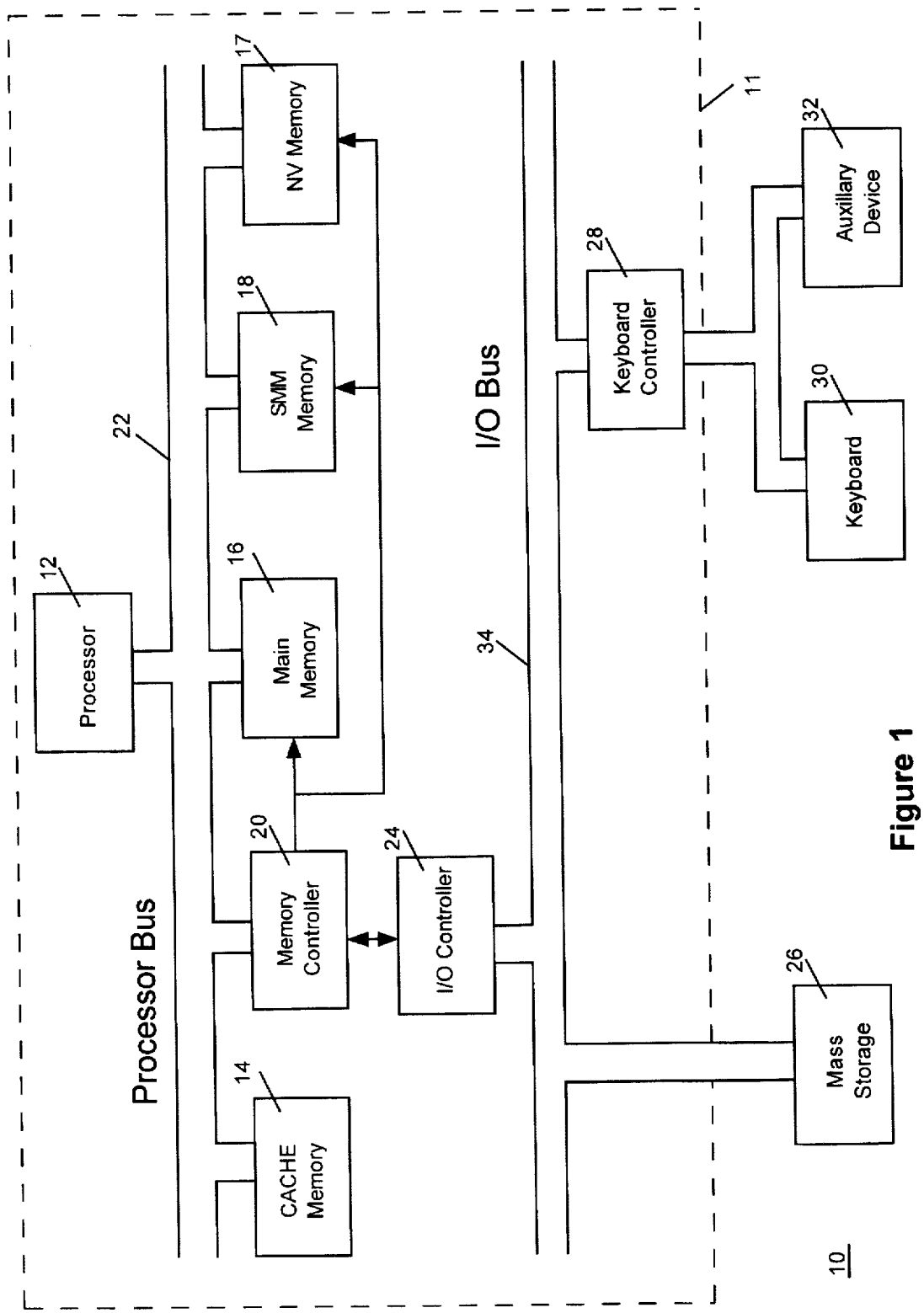
FIG. 1 illustrates an exemplary computer system incorporating the teachings of the present invention.

Referring now to FIG. 1, an exemplary computer system incorporating the teachings of the present invention is illustrated. Exemplary computer system 10 includes motherboard 11 incorporated with the teachings of the present invention, and external devices 26 and 30–32. Motherboard 11 includes processor 12, cache memory 14, main memory 16, system management mode (SMM) memory 18, memory controller 20, and processor bus 22 coupled to each other as shown. Additionally, motherboard 11 further includes input/output (I/O) controller 24, non-volatile (NV) memory 17, keyboard controller 28 incorporated with the teachings of the present invention, and I/O bus 34, coupled to each other and the earlier enumerated elements as shown. External devices 26 and 30–32 include mass storage 26, keyboard 30 and auxiliary device 32 such as a mouse. Mass storage 26 is coupled to I/O bus 34 directly, while keyboard 30 and auxiliary device 32 are coupled to I/O bus 34 through keyboard controller 28. Other I/O devices (not shown) may also be coupled to I/O bus 34 through keyboard controller 28.

Processor 12 performs its conventional function of executing instructions of programs, including application programs, subsystem and operating systems. In particular, processor 12 includes circuitry for being interrupted by a system management interrupt (SMI), which is an interrupt unmaskable by the executing programs. Furthermore, the instruction set supported by processor 12 includes a Resume instruction for subsequently resuming execution of the interrupted programs. As will be described in more detail below, the interrupted programs resume execution as if they were never interrupted. During this period, from interruption to resumption, processor 12 is said to be executing in a system management mode (SMM). Particular examples of processor 12 include i486™ and Pentium® processors manufactured by Intel Corp. of Santa Clara, Calif., assignee of the present invention.

SMM memory 18 is used to store an SMI handler for servicing each SMI, and temporarily saving the processor state while servicing an SMI. SMI handler further includes security functions for providing system security to computer system 10, which will be described in more detail below. Upon servicing an SMI, the SMI handler uses the Resume instruction to resume execution of the interrupted programs. SMM memory 18 is normally not mapped into the system memory space. SMM memory 18 is mapped into the system memory space only when an SMI needs to be serviced, and unmapped upon servicing the SMI. SMM memory 18 may be implemented with any number of random access memory (RAM) known in the art.

Non-volatile (NV) memory 17 is used to store a programmable password, which is used during operation to impose system security and prevent unauthorized usage of computer system 10. Similarly, NV memory 17 may be implemented in any number of manners known in the art.

Memory controller 20 performs its conventional function of controlling accesses to the various memories 14, 16, 17, and 18. In particular, memory controller 20 includes circuitry for dynamically mapping and unmapping SMM memory 18 into the system memory space under the control of processor 12. Memory controller 20 may also be implemented with any number of memory controllers known in the art.

Keyboard controller 28 performs its conventional function of controlling keyboard 30 and auxiliary device 32. However, keyboard controller 28 is enhanced to complement the security functions of the SMI handler to deliver system security, which will be more fully described below.

All other elements 14–16, 22–26, and 32–34 perform their conventional functions. Their constitutions are well known and will not be otherwise described.

Before describing the SMI handler and keyboard controller 28 in detail, it should be noted that while for ease of understanding, the present invention is being mainly described with the keyboard controller 28 being enhanced to complement the security functions of the SMI handler for delivering system security, based on the description to follow, a person skilled in the art will appreciate that the present invention may be practiced with the enhanced keyboard controlling facility being embodied in a number of alternative manners, including but not limited to a coordinated I/O and keyboard controllers approach, or an integrated I/O-Keyboard controller approach, etc.

Additionally, while for ease of explanation, enumerated elements 12–24, 28 and 34 are shown as being disposed on a single circuit board or motherboard 11, in other embodiments, selected ones of these enumerated elements may be disposed off motherboard 11.

Figure 2:
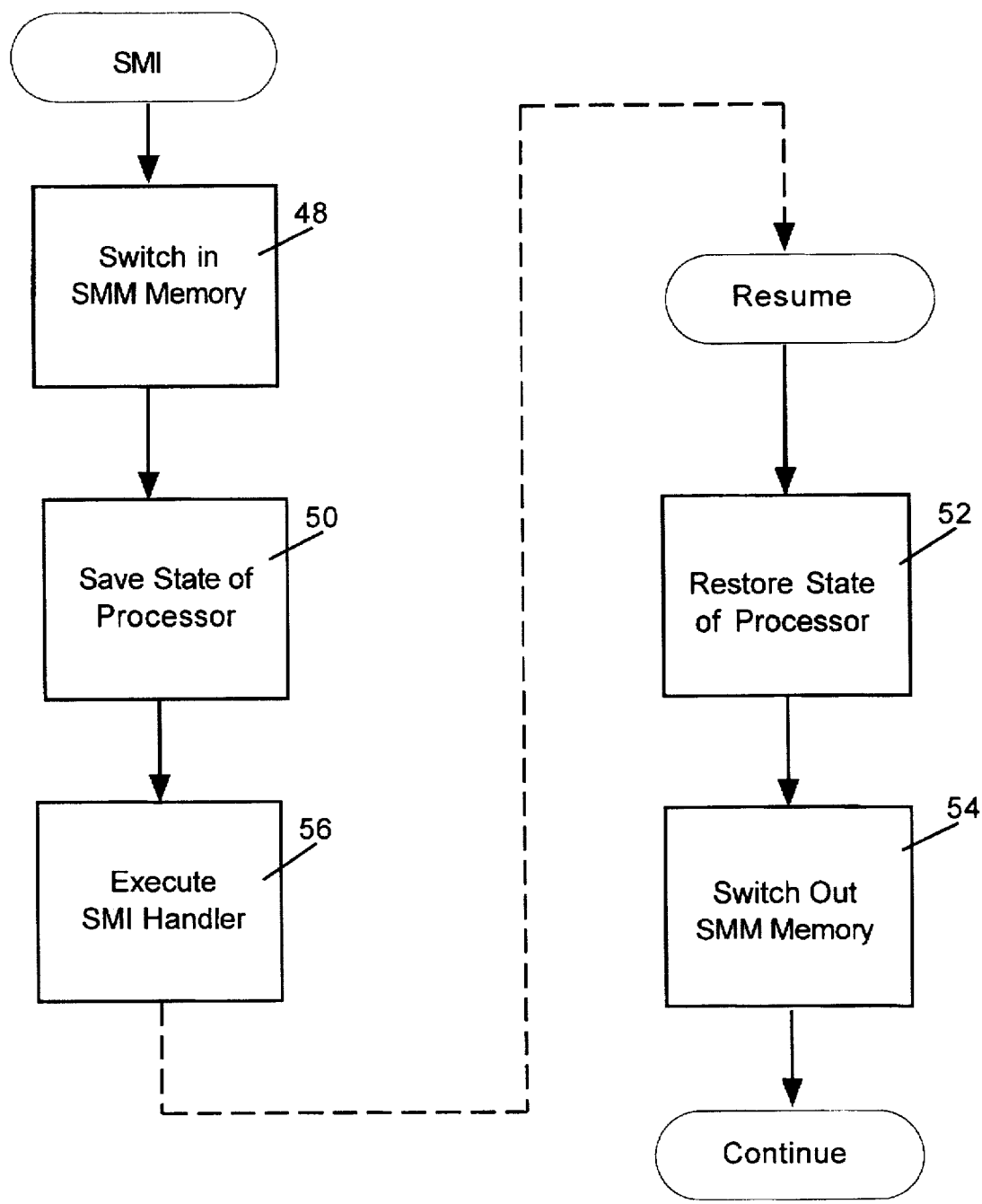
FIG. 2 illustrates one embodiment of the method steps employed by exemplary computer system of FIG. 1 for handling transparent system interrupts.

Furthermore, with references to FIG. 2, we will briefly describe the servicing of an SMI. As shown, upon detection of an SMI, processor 12 directs memory controller 20 to switch in and map SMM memory 18 as part of the system memory space, and in response, memory controller 20 performs the requested switching and mapping accordingly, step 48. Next, processor 12 saves the processor state into SMM memory 18, step 50. Upon saving the processor state, processor 12 transfers execution control to the pre-stored SMI handler, step 56.

The SMI handler then determines the cause of the SMI and services the SMI accordingly. Upon servicing the SMI, the SMI handler executes a Resume instruction to transfer execution control back to the interrupted programs. In response, processor 12 restores the saved processor state in SMM memory 18, step 52. Furthermore, processor 12 directs memory controller 20 to unmap SMM memory 18 from the system memory space and switch out SMM memory 18. In response, memory controller 20 performs the requested unmapping and switching accordingly, step 54.

As a result, the SMI is serviced in a manner that is transparent to the executing operating system, subsystems as well as applications. In other words, an SMI is a transparent system service interrupt. As will be explained in more detail, the present invention exploits the functions offered by the SMI and the SMM to allow the SMI handler to bear the main burden for providing system security to computer system 10.

Figure 3:
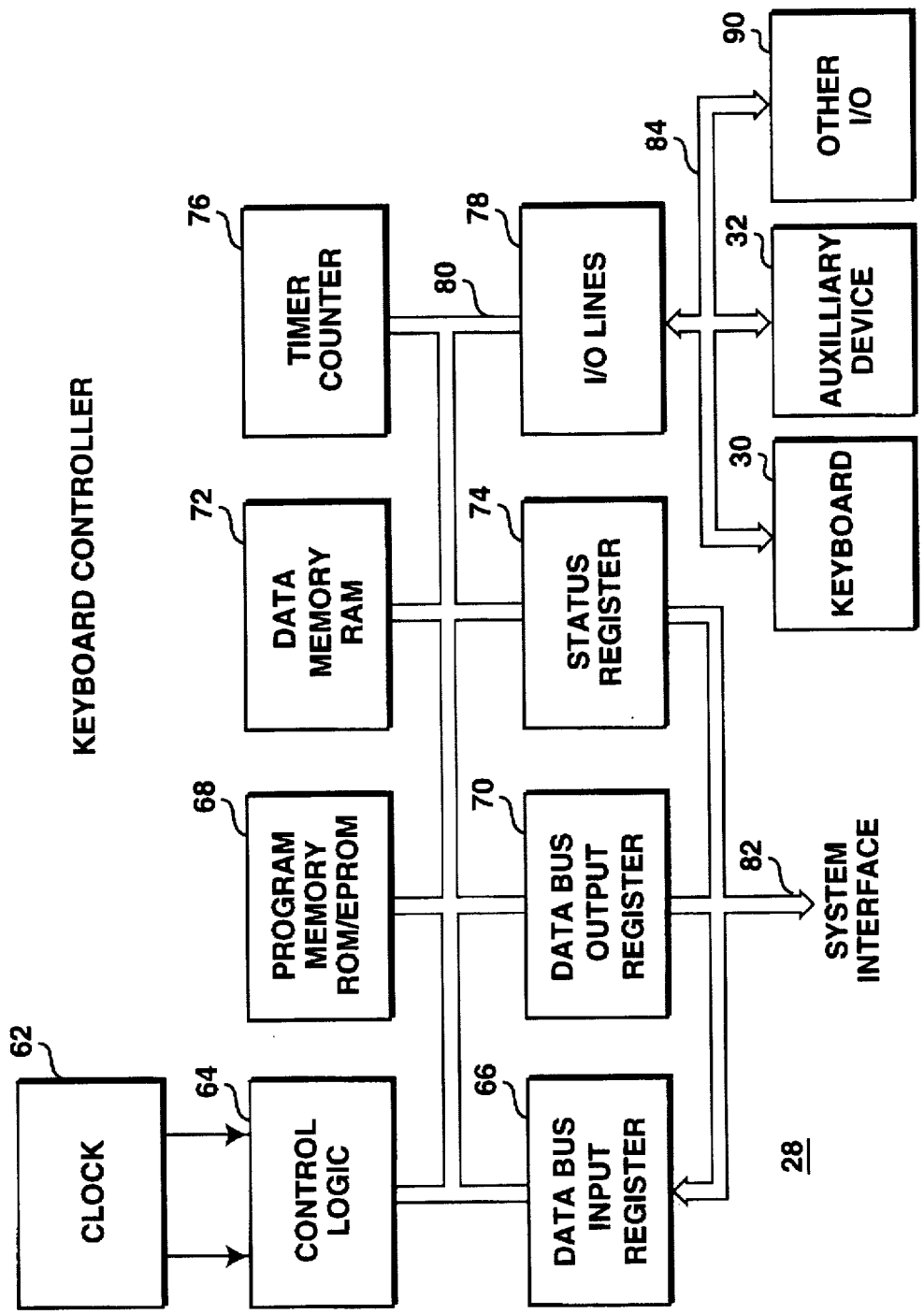
FIG. 3 illustrates one embodiment of the keyboard controller of FIG. 1.

Referring now to FIG. 3, wherein one embodiment of keyboard controller 28 of FIG. 1 is illustrated. As shown, keyboard controller 28 includes clock 62, control logic 64, read only memory 68, random access memory 72 and bus 80 coupled to each other as shown. Additionally, keyboard controller 28 also includes data bus input register 66, data bus output register 70, and status register 74, coupled to bus 80 and interface 82 as shown. Furthermore, keyboard controller 28 includes timer counter 76 and I/O lines 78 coupled to bus 80 as shown. Keyboard 30 and auxiliary device 32 are coupled to I/O lines 78 through interface 84. Collectively, data bus input register 66, data bus output register 70, and status register 74 are also referred to as the "system port", whereas I/O lines 78 are also referred to as the "device port".

Control logic 64 controls the operation of keyboard controller 28, executing controller firmware incorporated with the teachings of the present invention. In particular, the firmware implements a plurality of commands supported by keyboard controller 28. For the most part, these commands are the commands required to be compatible with what's known in the art as the standard IBM® PS/2 Keyboard Controller commands. These commands includes a first command for processor 12 to download a password from NV memory 17 to keyboard controller 28, and a second command for processor 12 to direct keyboard controller 28 to activate system security (but without shutting off commands from processor 12 to connected devices 30–32, nor proper responses from connected devices 30–32 to processor 12).

As will be described in more detail below, in accordance with the present invention, the controller firmware implements these support by causing keyboard controller 28 to operate in one of three modes, a normal mode, a sleuth mode, and a secured mode. The controller firmware is pre-loaded in read only memory 68. Random access memory 72 is used to store various operational data. I/O lines 76 are used to transfer commands/status and data to/from the connected devices, which include keyboard 30 and auxiliary device 32. Data bus input and output registers 66 and 70, and status register 74 are used to transfer commands/status and data from/to processor 12.

As will be obvious from the description to follow, keyboard controller 28 having the requisite controller firmware in accordance with the present invention may be implemented with any number of well known "programmable" keyboard controllers, including but not limited to the 8042 keyboard controller manufactured by Intel Corp. of Santa Clara, Calif., assignee of the present invention.

Figure 4:
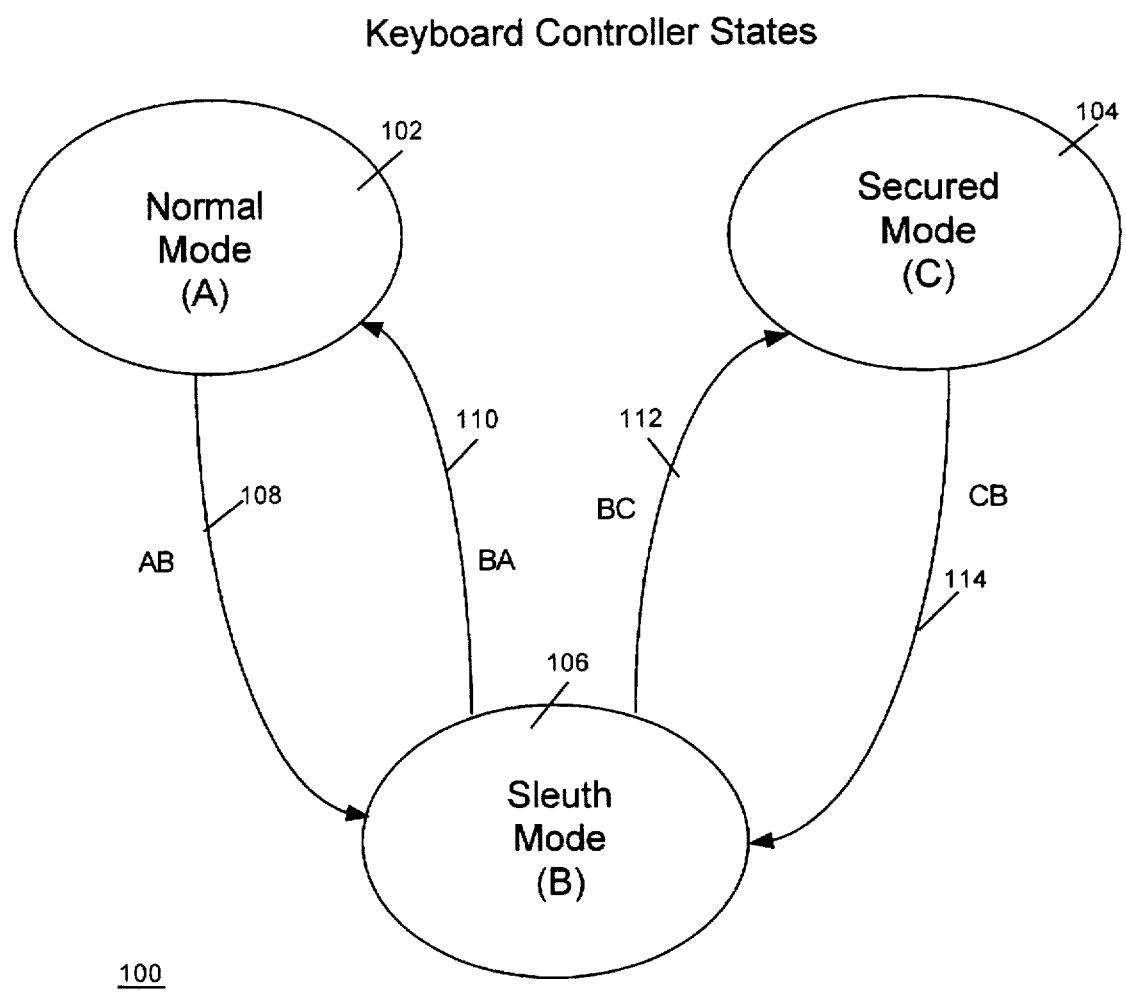
FIG. 4 illustrates the operational modes of the keyboard controller of FIG. 3.

FIG. 4 illustrates the operating modes of keyboard controller 28 in further detail. As shown, keyboard controller 28 operates in one of three modes, normal mode 102, sleuth mode 106, and secured mode 104. Upon initialization, keyboard controller 28 first operates in normal mode 102. While in normal mode 102 keyboard controller 28 facilitates data inputs from the connected devices 30–32 to processor 12 as in the prior art. However, keyboard controller 28 switches into sleuth mode 106 whenever one of a number of pre-determined system security related events occurs. While in sleuth mode 106, keyboard controller 28 communicates and responds to the direction of the SMI service handler exclusively. Keyboard controller 28 either returns to normal mode 102 or switches to secured mode 104 as instructed by the SMI handler. While in secured mode 104, keyboard controller 28 inhibits inputs from the connected devices 30–32, except when the connected devices 30–32 are to respond to a command directed to them by processor 12, which are still provided to the connected devices 30–32 under secured mode 104, thereby securing computer system 10. As a result, the main burden for providing system security is borne by the SMI handler, allowing only minimal system security controller firmware functions to be required of keyboard controller 28 or other embodiments of keyboard controlling facilities, thereby substantially lowering the cost of keyboard controller 28 as well as the other embodiments of keyboard controlling facilities. Furthermore, since the functions supported by the SMI handler is a lot easier to extend, the system security features supported can also be extended a lot easier. The manner in which keyboard controller 28 transitions between the various modes 102–106, and how keyboard controller 28 operates in each of these modes 102–106 will be described in more detail below.

Figure 5:
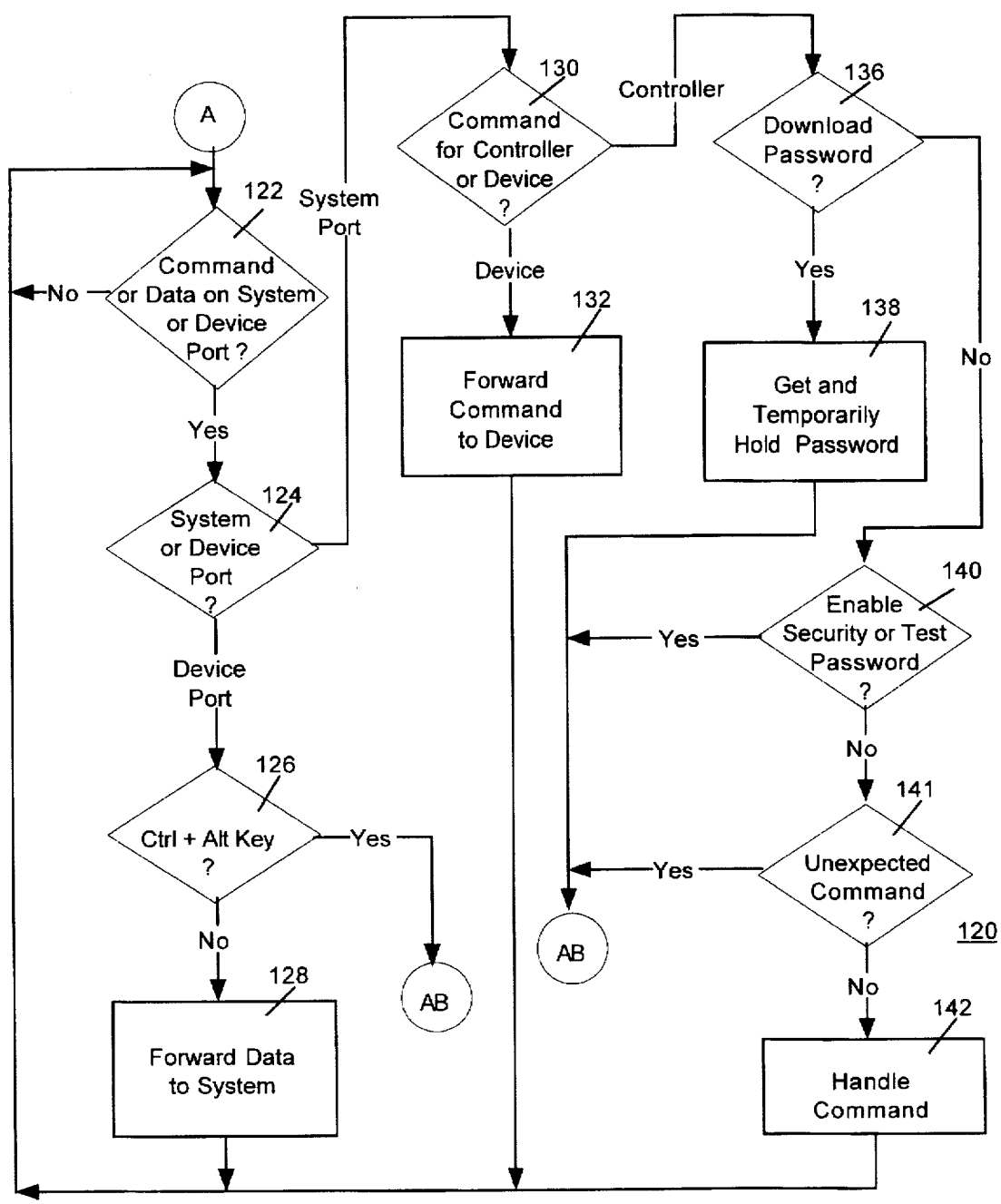
FIGS. 5–8 illustrate one embodiment each of the method steps employed by the keyboard controller of FIG. 3 for operating under the various modes.

FIG. 5 illustrates the method steps employed by the firmware to operate keyboard controller 28 in the normal mode 102. As shown, while in normal mode 102, control logic 64 monitors for presence of a command/data on either the system or device ports, step 122. If data is detected on the device port, steps 122 and 124, control logic 64 further determines if the detected data together with the two immediate predecessor data form a sequence of "hot keys" (i.e., Ctrl+Alt+<key>), step 126. If the data together with the two immediate predecessor data do not form a sequence of "hot keys", control logic 64 updates the two last two bytes received from the connected devices 30–32, and forwards the data to processor 12, step 128. If the data together with the two immediate predecessor data form a sequence of "hot keys", control logic 64 updates the two predecessor bytes received from the connected devices 30–32, and transitions into the sleuth mode.

On the other hand, if a command is detected on the system port at steps 122 and 124, control logic 64 further determines if the command is directed towards one of the connected devices 30–32 or itself, step 130. If the command is directed towards one of the connected devices 30–32, control logic 64 forwards the command to the connected device 30/32, step 128. If the command is directed towards keyboard controller 28 instead, control logic 64 further determines if the command is either the "download password" command[1] or the "enable security or test password" command or an expected command, steps 136, 140 and 141. If the command is an expected command other than the three "special" security related commands, control logic 64 handles the commands as in the prior art, step 142, and returns to monitoring for additional command/data on system/device port. If the command is the "download password" command", control logic 64 gets and temporarily holds the password from NV memory 17, step 138, and then transitions into sleuth mode 106. If the command is either the "enable security" command or the "test password" command or an unexpected command, control logic 64 simply transitions into sleuth mode 106.

[1] Typically, the processor requests the keyboard controller to download the password(s) at system initialization time.

Figure 9:
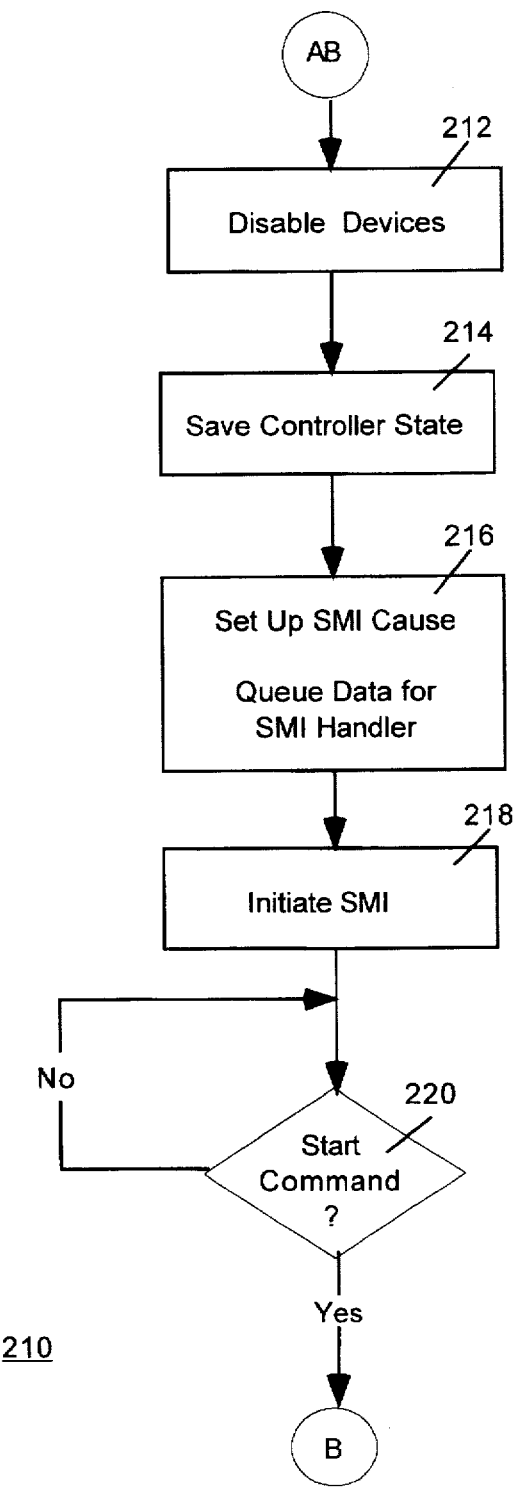
FIGS. 9–12 illustrate one embodiment each of the method steps employed by the keyboard controller of FIG. 3 for transitioning between the various modes.

Skipping now to FIG. 9, wherein the method steps employed to transition into sleuth mode 106 are shown. As shown, control logic 64 first inhibits communication with the connected devices 30–32, step 212, saves the internal state information, step 214, sets up the SMI cause (i.e. password being downloaded, instructed to activate security, or "hot keys" detected etc.) including queuing data for the SMI handler, step 216, and then triggers an SMI to transfer execution control to the SMI handler as described earlier, step 218. Control logic 64 then waits for a "start" command from the SMI handler to proceed operating in sleuth mode 106, step 220.

As will be described in more detail below, the SMI handler processes the SMI in accordance to the cause the SMI was triggered, and provides control logic 64 with the appropriate responses/instructions.

Figure 6:
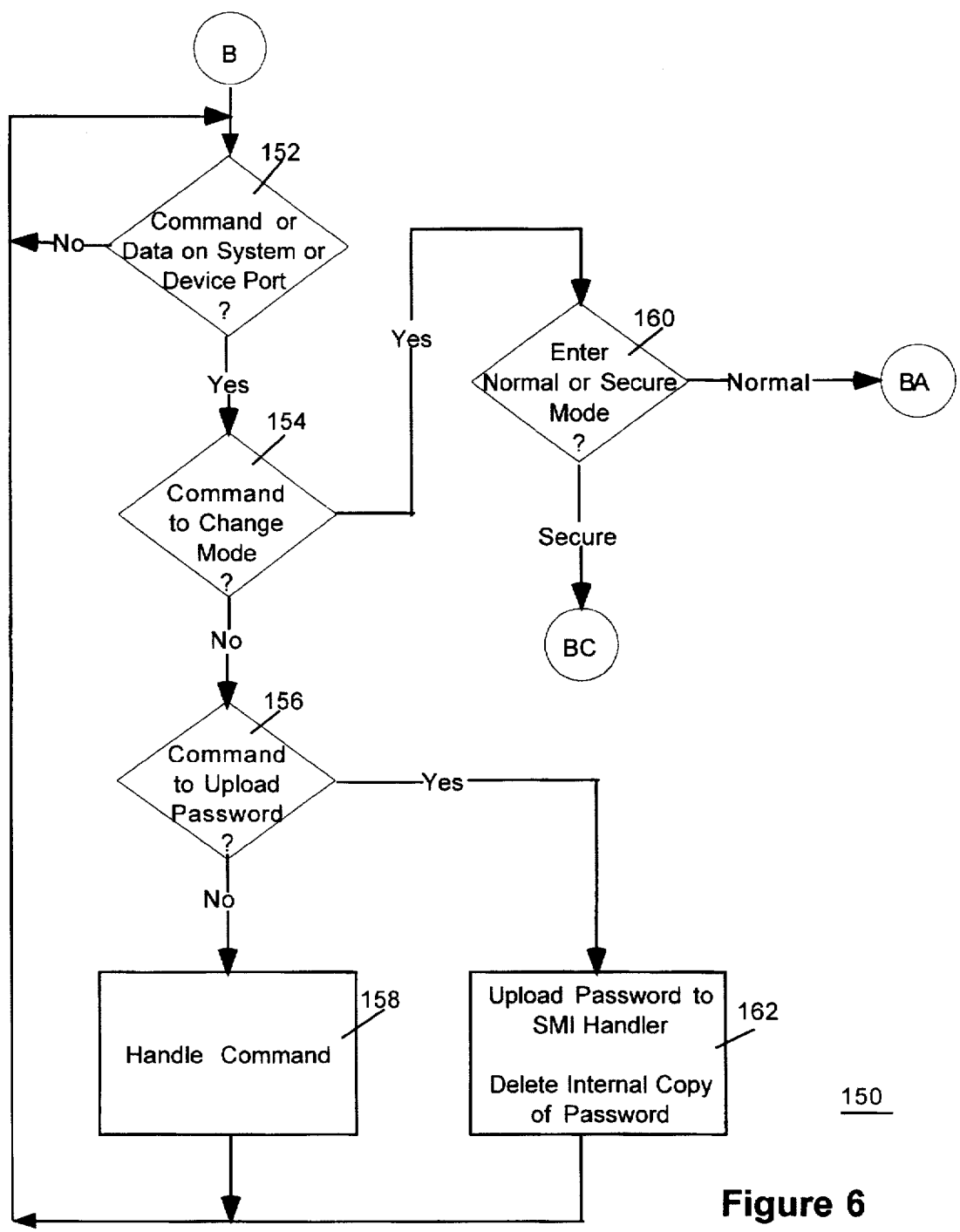

Referring now to FIG. 6, the method steps employed by control logic 64 to operate keyboard controller 28 in sleuth mode 106 are illustrated. Upon receipt of the "start" command from the SMI handler, control logic 64 enters sleuth mode 106 and starts monitoring the system port for additional commands/data from the SMI handler, step 152. Upon detecting commands/data at the system port, control logic 64 determines if it is being commanded to perform certain function(s) or change modes, step 154. If it is commanded by the SMI handler to perform certain function(s), control logic 64 determines the nature of the command and responds accordingly, steps 156, 158, and 162. In particular, if it is a request from the SMI handler to "upload" the password, step 156, control logic 64 responds accordingly, and additionally deletes its own copy of the password, step 162. Upon performing the request function, control logic 64 returns to monitoring the system port for additional commands from the SMI handler, step 152. Eventually, when all cooperative processing between the SMI handler and control logic 64 are completed, control logic 64 will determine at steps 154 and 160 that it is being requested to either return to normal mode 102 or enter secured mode 104. In response, control logic 64 transitions into the requested mode 102/104.

Figure 10:
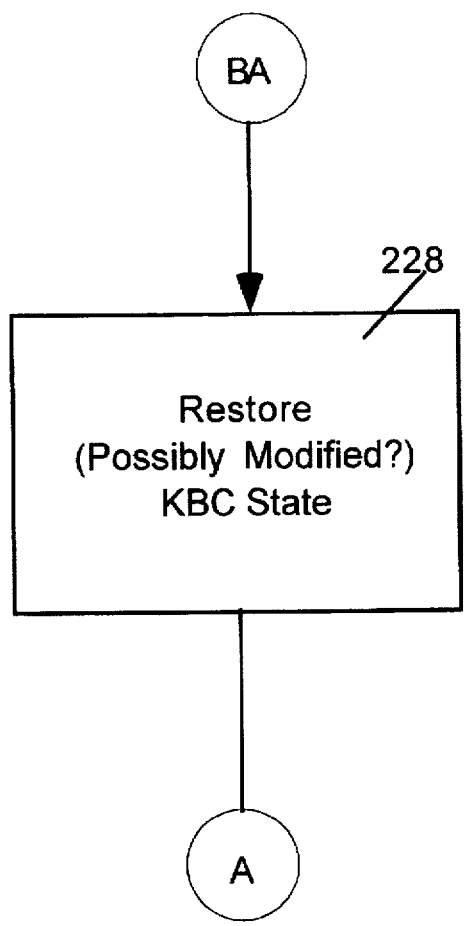
Figure 11:
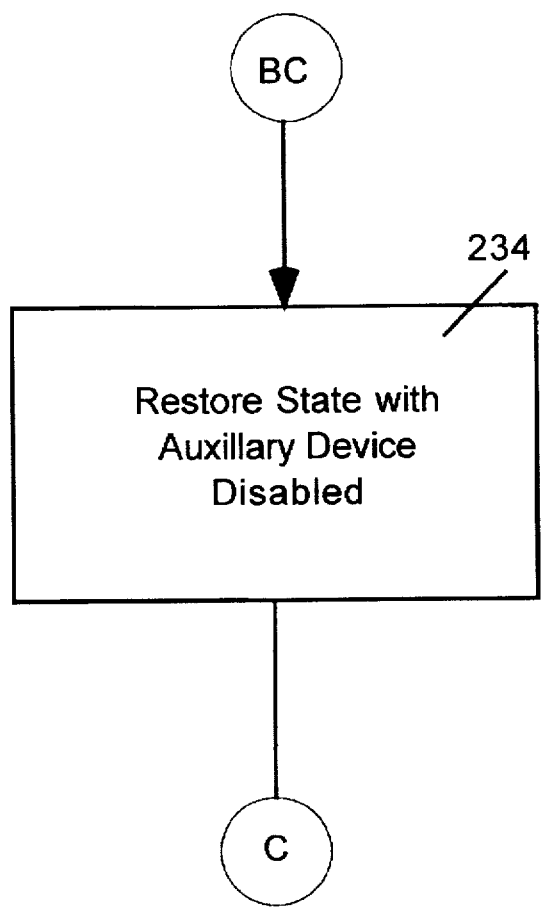

Skipping now briefly to FIGS. 10 and 11, wherein transitions from sleuth mode 106 to normal mode 102 and to secured mode 104 are illustrated. As shown, for transitioning to normal mode 102, control logic 64 restores keyboard controller 28 to either the saved state or to a new modified state, depending on whether the state of keyboard controller 28 has been modified while in sleuth mode 106, step 228. However, for transitioning to secured mode 104, control logic 64 restores keyboard controller 28 to the saved state, and leaving communication with auxiliary device 32 inhibited, step 234.

If control logic 64 returns to normal mode 102, steps 122–122 will be repeated as described earlier.

Figure 7:
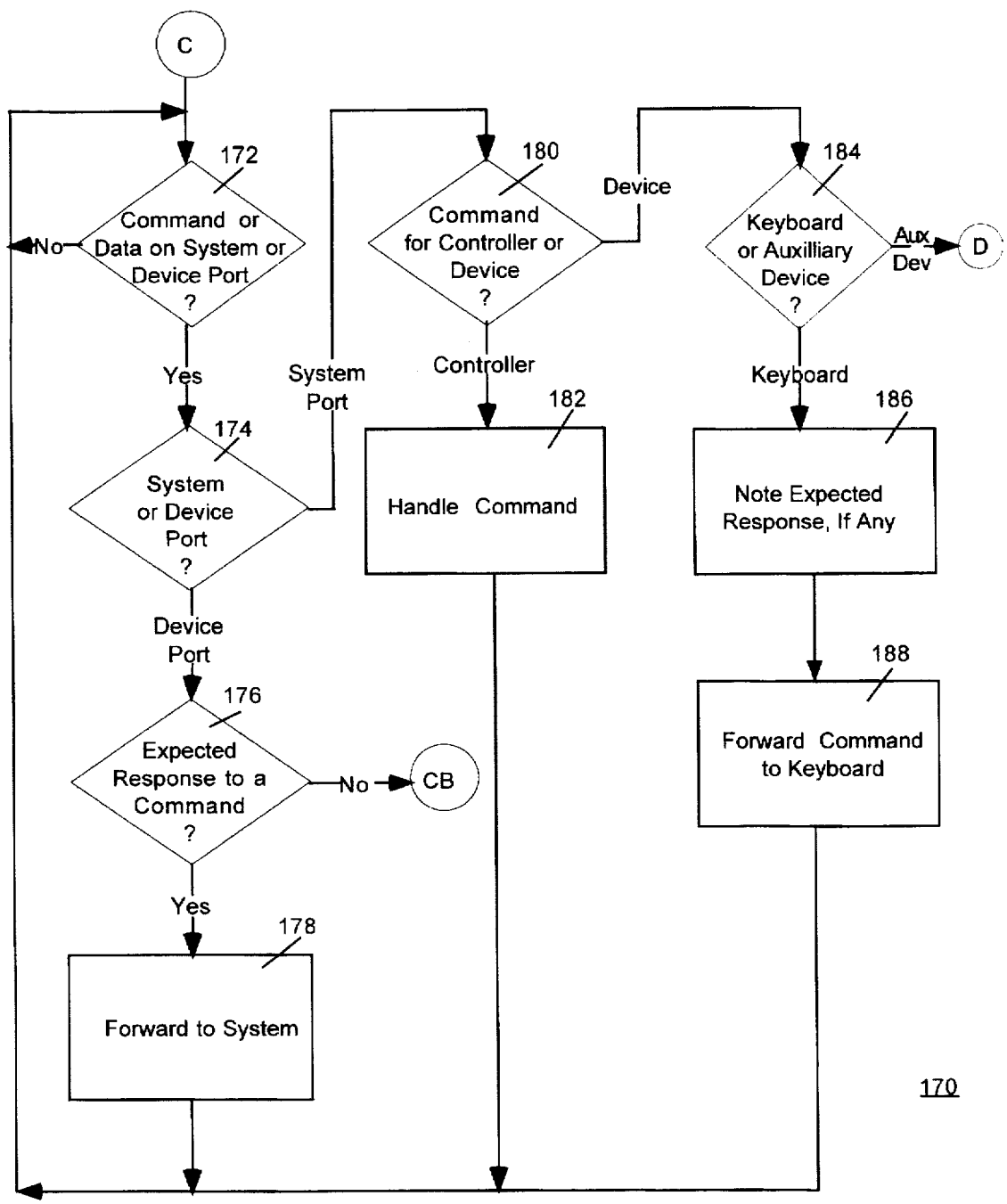
Figure 8:
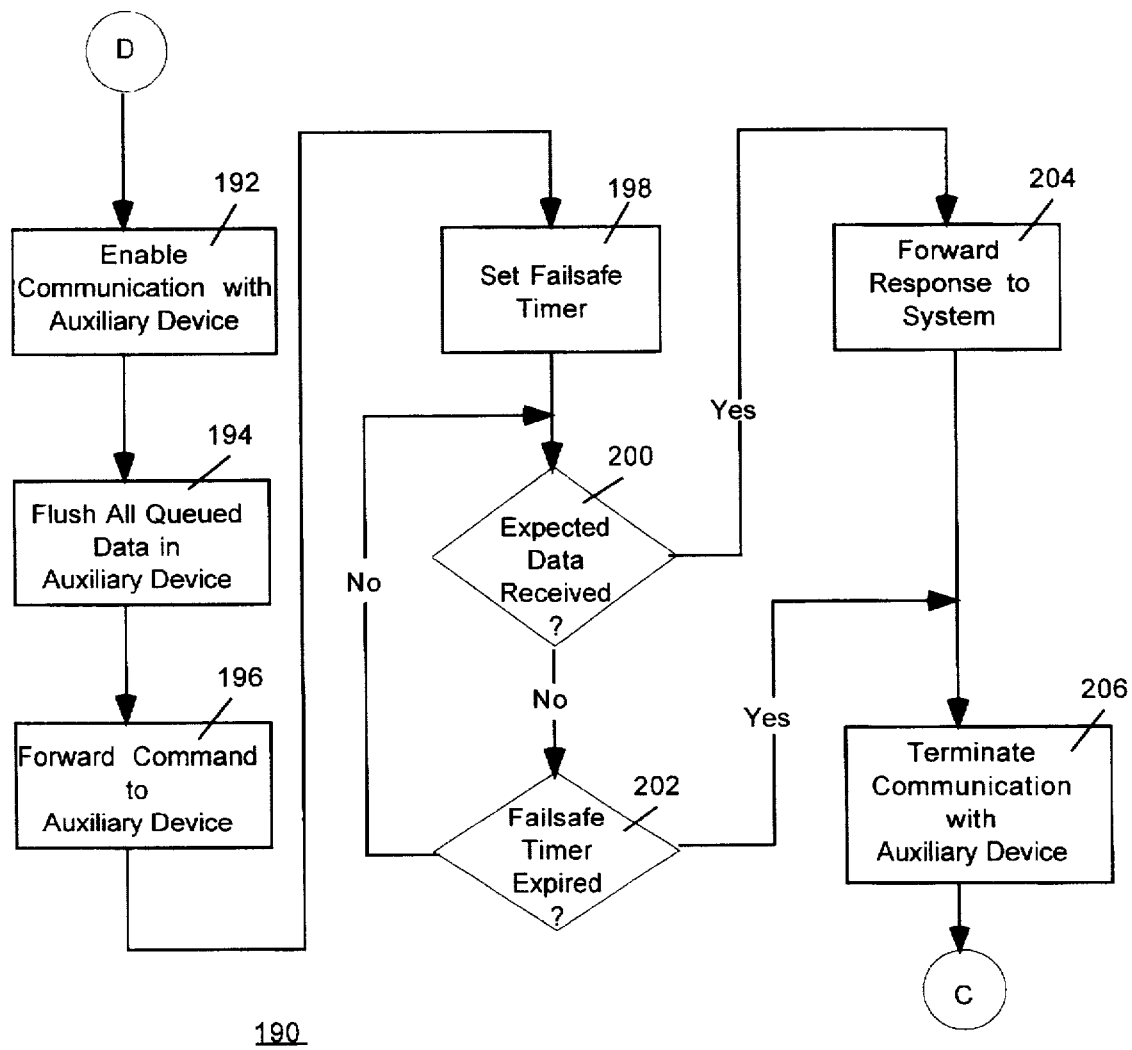

Referring now to FIGS. 7–8, wherein the method steps employed by control logic 64 to operate in secured mode 104 are illustrated. As shown in FIG. 7, upon entry into secured mode 104, control logic 64 monitors the system and data ports for commands/data from either processor 12 or keyboard 30. If a command is detected at the system port, steps 172–174, control logic 64 determines if the command is directed to keyboard controller 28 or one of the connected devices 30–32, step 180. If it is directed to keyboard controller 28, control logic 64 handles the command accordingly, step 182. If it is not directed to keyboard controller 28, control logic 64 further determines if the command is for keyboard 30 or auxiliary device 32, step 184. If the command is for keyboard 30, control logic 64 notes the expected response from keyboard 30, if any, and forwards the command to keyboard 30, steps 186 and 188. A particular example of expected response from keyboard 28 is it's identifier, when processor 12 requests keyboard 28 to identify itself.

On the other hand, if the command is for auxiliary device 32, as shown in FIG. 8, control logic 64 enables communication with auxiliary device 32, step 192. Upon enabling communication with auxiliary device 32, control logic 64 first flushes all queued data in auxiliary device, step 194, then forwards the command to auxiliary device 32, step 196. After forwarding the command, control logic 64 sets a failsafe timer to expire after a predetermined amount of time has elapsed, step 198. Having set the timer, control logic 64 monitors for the presence of expected response from auxiliary device 32 or the expiration of failsafe timer, steps 200–202.

When the expected response is detected, control logic 64 forwards the response to processor 12, step 204, and terminates communication with auxiliary device 68 again, step 206. Alternatively, if the failsafe timer expires and the expected response has not been received, control logic 64 nevertheless terminates communication with auxiliary device 68, step 206. Either case, control logic 64 returns to monitoring system and data ports for command/data from processor 12 or keyboard 30.

At steps 172–174, whenever it is data at device port that is detected, control logic 64 proceeds to determine if the data is the response expected by processor 12, step 176. If it is the response processor 12 is expecting, control logic 64 forwards the response to processor 12, and returns to monitoring system and device ports. On the other hand, if the data is not the response processor 12 is expecting, control logic 64 transitions back to sleuth mode 106.

Figure 12:
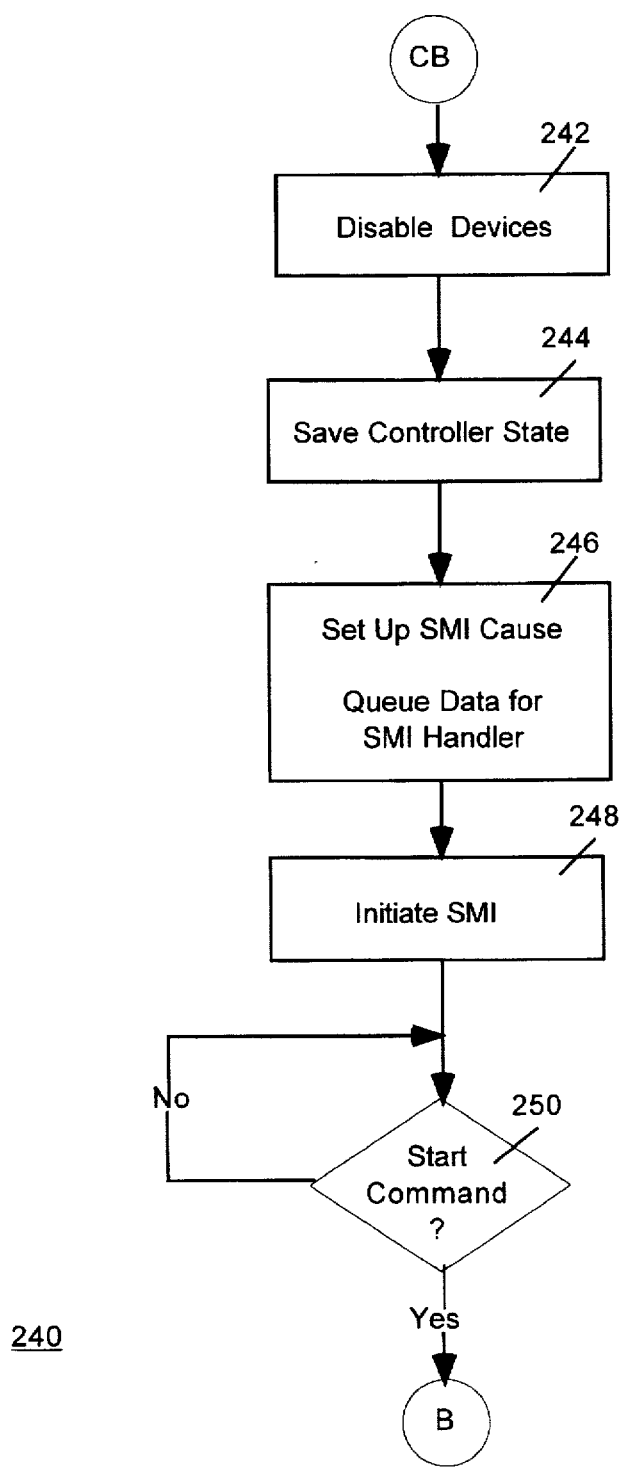

Skipping now to FIG. 12, wherein transition from secured mode 104 to sleuth mode 106 is illustrated. First, control logic 64 inhibits communication with keyboard 30 (communication with auxiliary device 32 has already been inhibited), step 242. Next, control logic 64 saves its state, step 244. Then control logic 64 sets up the reason for the SMI it is about to trigger, including queuing data for the SMI handler, step 246. Upon doing so, control logic 64 triggers the SMI, step 248, and then waits for a "start" command from the SMI handler, step 250, before proceeding to operate in sleuth mode 106 as described earlier.

Figure 13:
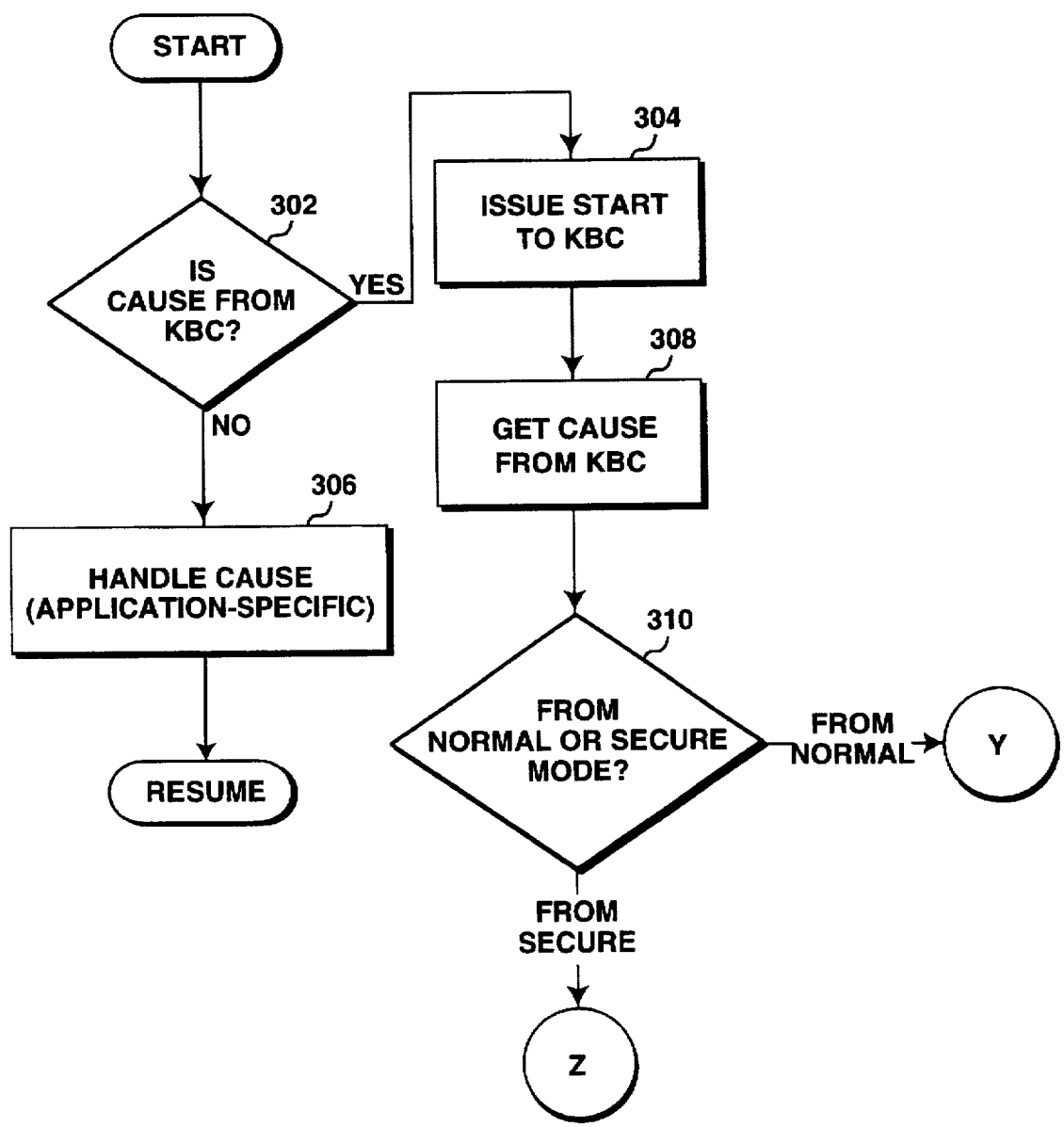
FIGS. 13–15 illustrate one embodiment of the method steps employed by the SMI handler to provide system security.
Figure 14:
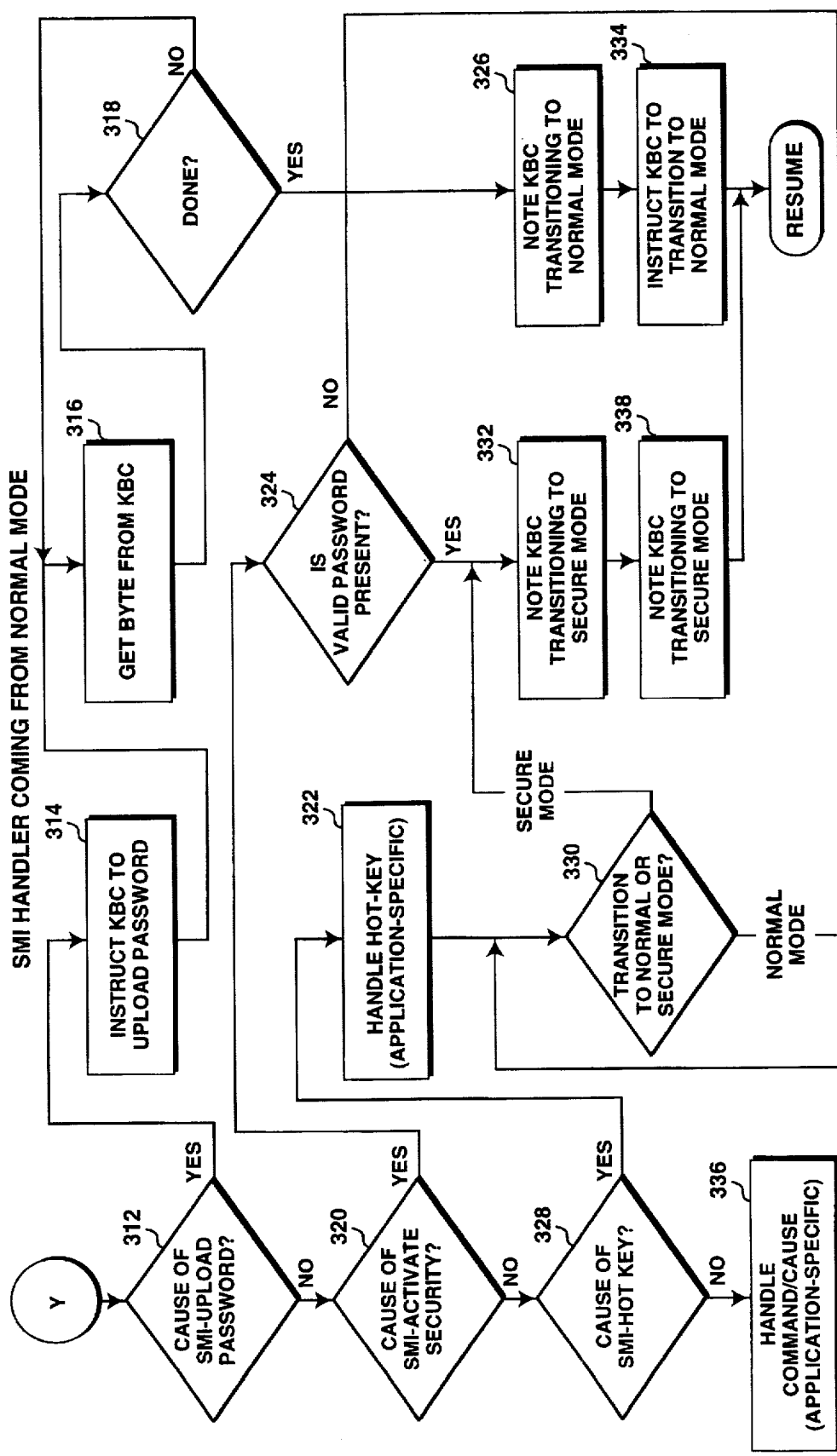
Figure 15:
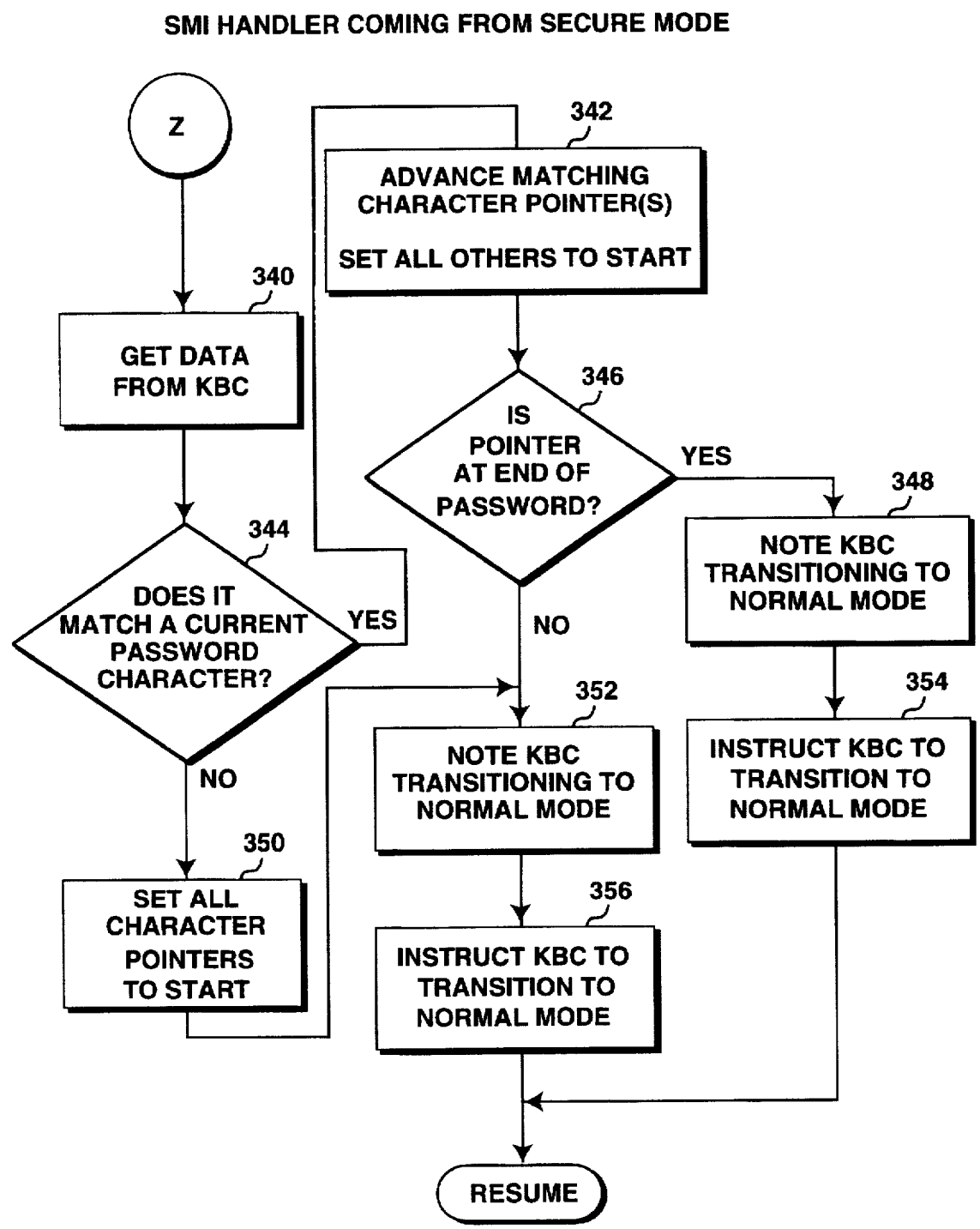

Referring now to FIGS. 13–15, wherein one embodiment of the essential method steps employed by the SMI handler to provide system security to computer system 10. As shown in FIG. 13, upon being given execution control, SMI handler first determines if the SMI is triggered by keyboard controller 28, step 302. If the SMI is not triggered by keyboard controller 28, SMI handler handles the SMI in an application specific manner, step 306. On the other hand, if the SMI is triggered by keyboard controller 28, SMI handler issues the start command to keyboard controller 28, step 304, and gets the cause of the SMI queued by keyboard controller 28, step 308. Upon obtaining the cause, SMI further determines whether keyboard controller 28 triggered the SMI while it was in normal mode 102 or in secured mode 104, step 310.

As shown in FIG. 14, if keyboard controller 28 triggered the SMI from normal mode 102, SMI handler then determines whether the cause of the SMI is because keyboard controller 28 was instructed to upload password, step 312, or keyboard controller 28 was instructed to activate security, step 320. If the cause is upload password, SMI handler instructs keyboard controller 28 to upload the password for SMI handler, step 314. SMI handler then gets the password from keyboard controller 28, one byte at a time, until the password has been uploaded, steps 316 and 318. Upon receipt of the password, SMI handler notes that keyboard controller 28 is transitioning back to normal mode 102, and instructs keyboard controller 28 to do so, steps 326 and 334. Then, SMI handler executes the Resume instruction to resume execution of the interrupted programs.

On the other hand, if it was determined that the cause for the SMI is because keyboard controller 28 was instructed to activate security, SMI handler checks to determine if at least one valid password is present, step 324. If no valid password is present, SMI handler notes and instructs keyboard controller 28 to return to normal mode as described earlier, steps 326 and 334. Otherwise, SMI handler notes that keyboard controller 28 is transitioning to secured mode 104, and instructs keyboard controller 28 to do so, steps 332 and 338. Either case, SMI handler then executes the Resume instruction to resume execution of the interrupted programs.

Back at steps 312 and 320, if it was determined that the cause of the SMI is neither upload password nor activate security, SMI handler then determines whether the cause is because keyboard controller 28 detected "hot keys". Whether the cause is keyboard controller 28 detected "hot keys" or some other reasons, SMI handler handles the "hot keys" or the other causes in an application dependent manner, steps 322 and 336. Upon handling the "hot keys" or some other commands, SMI handler determines if keyboard controller 28 is to return to normal mode 102 or secured mode 104, step 330. SMI handler then performs either steps 326 and 334 as described earlier if keyboard controller 28 is to return to normal mode 102, or steps 332 and 338 as described earlier if keyboard controller 228 is to return to secured mode 104. Either case, SMI handler then executes the Resume instruction to resume execution of the interrupted programs.

As shown in FIG. 15, if keyboard controller 28 triggered the SMI from secured mode 104, SMI handler obtains the data from keyboard controller 340. Upon obtaining the data, SMI handler determines if the data obtained match the "next" character of any of the passwords, step 344. If the data obtained does not match the "next" character of any of the passwords, SMI handler resets all character pointers for the passwords to start, step 350. SMI handler then notes keyboard controller 28 is transitioning back to secured mode 104, and instructs keyboard controller 28 to do so, steps 352 and 356. Then, SMI handler executes the Resume instruction to resume execution of the interrupted programs.

On the other hand, back at step 344, if the data obtained matches the "next" character of one or more of the passwords, SMI handler advances the character pointer(s) of the matching password(s), and resets all character pointers of the other passwords to start, step 342. Next, SMI handler determines if one of the character pointer(s) of the matching password(s) is at the end of the matching password, step 346. If a character pointer is not at the end of a matching password, SMI handler performs steps 352 and 356, and then execute the Resume instruction as described earlier. Otherwise, SMI handler notes keyboard controller 28 is transitioning to normal mode 102, and instructs keyboard controller 28 to do so, steps 348 and 354. Then, SMI handler executes the Resume instruction to resume execution of the interrupted programs.

Figure 16:
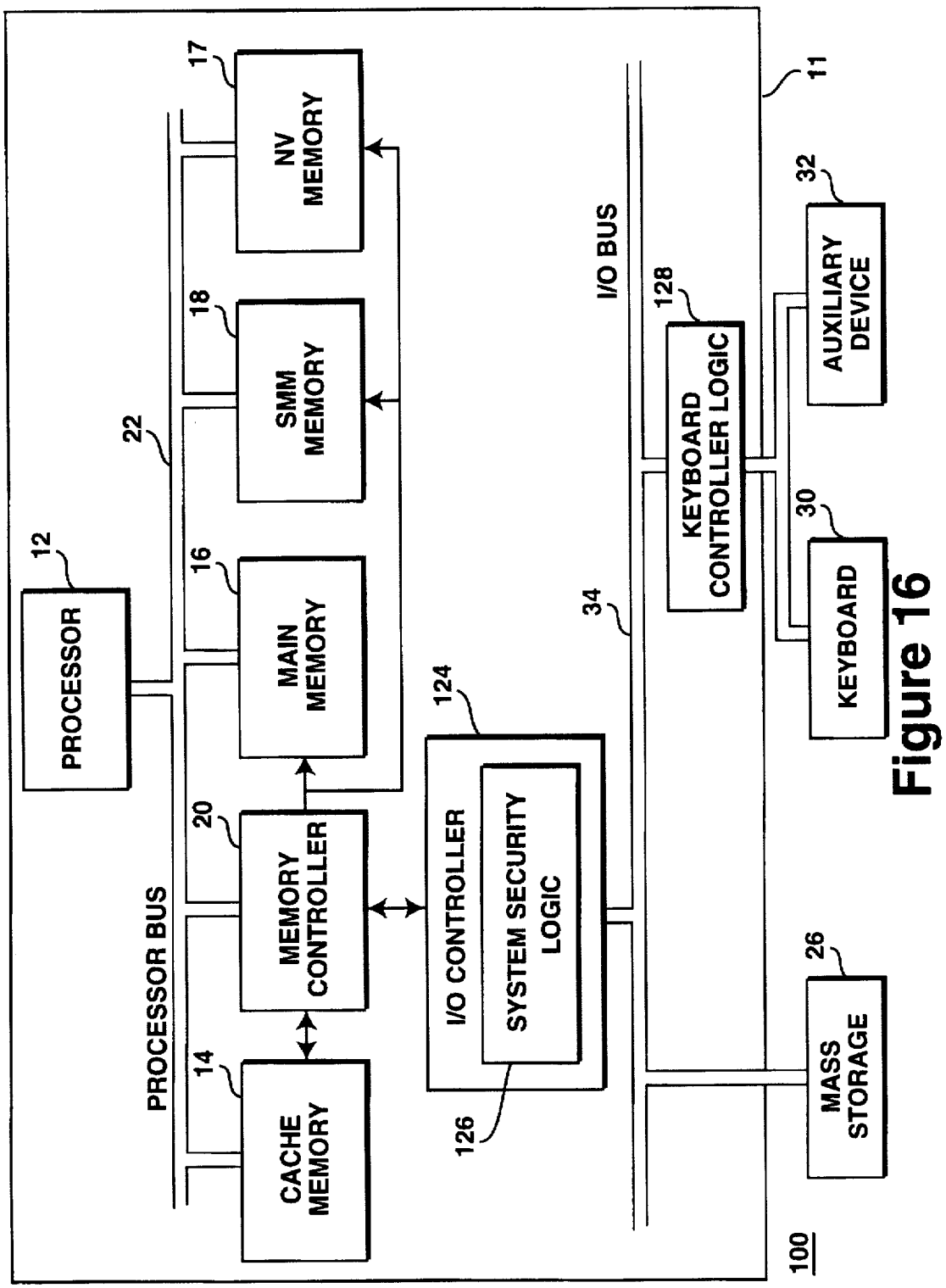
FIGS. 16–17 illustrate two exemplary alternate embodiments of the present invention.
Figure 17:
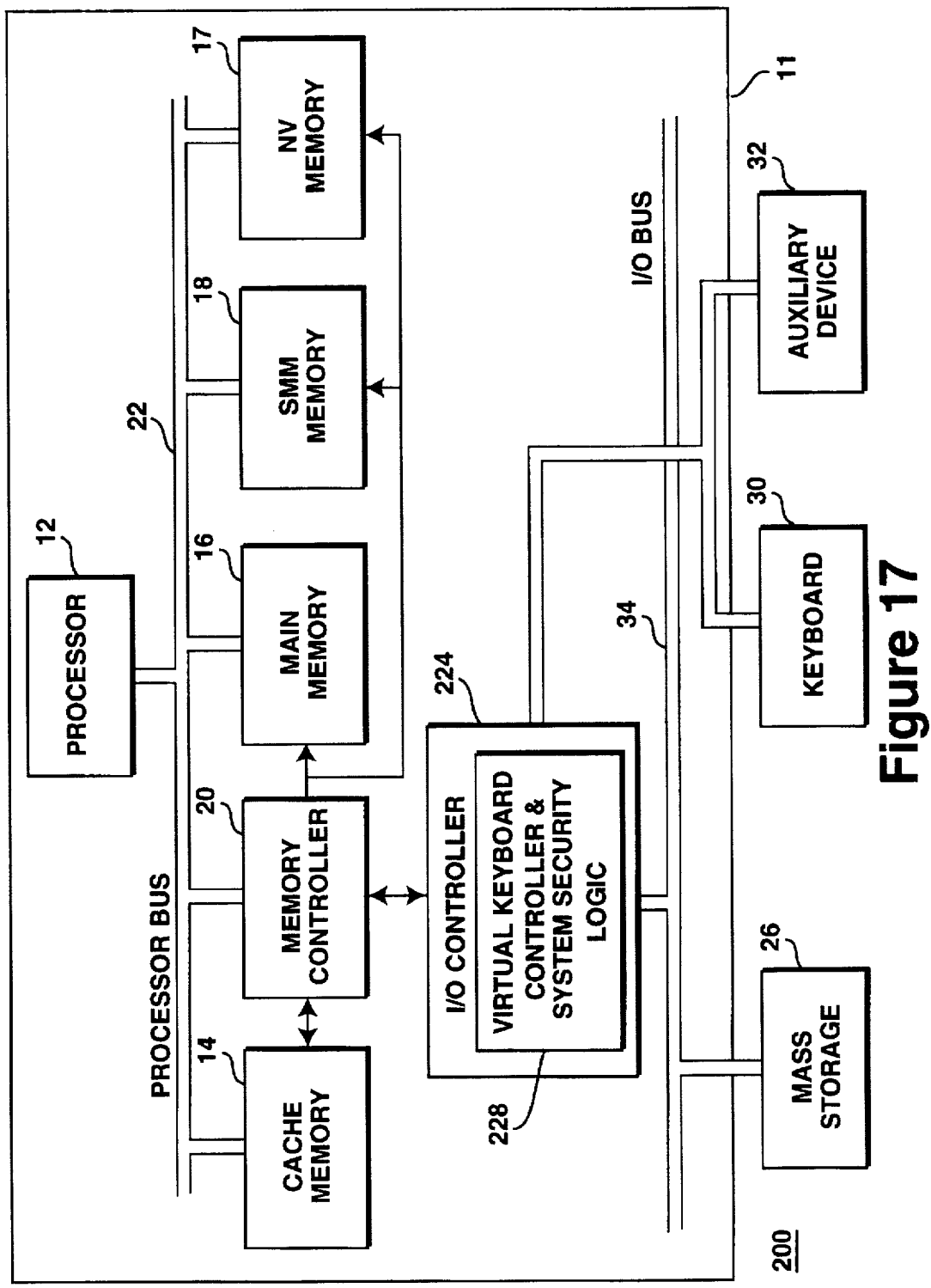

Referring now to FIGS. 16–17, wherein two exemplary alternate embodiments of the present invention are illustrated. FIG. 16 illustrates exemplary computer system 100 incorporated with the teachings of the present invention. Exemplary computer system 100 is substantially the same as exemplary computer system of FIG. 1, except for their keyboard controller 128, and I/O controller 124. Unlike keyboard controller 28 of FIG. 1, where enhancements are provided to complement the SMI handler of the present invention to deliver system security, keyboard controller 128 is a conventional keyboard controller known in the art. On the other hand, unlike I/O controller 24 of FIG. 1, which is a conventional I/O controller known in the art, I/O controller 124 has been enhanced to include the complementary functions provided to keyboard controller 28 of FIG. 1. The complementary functions are implemented using a state machine 126 having states and state transitional rules in accordance the teachings described earlier, which is well within the ability of those skilled in the art.

FIG. 17 illustrates exemplary computer system 200 incorporated with the teachings of the present invention. Exemplary computer system 200 is also substantially the same as exemplary computer system of FIG. 1, except for I/O controller 24 and the fact that it does not have a separate keyboard controller. Unlike I/O controller 24 of FIG. 1, which is a conventional I/O controller known in the art, I/O controller 24 has been enhanced to include the functions of keyboard controller 28 of FIG. 1, including the enhancement provided to complement the SMI controller for delivery of system security.

Thus, a method and apparatus for providing system security to personal computer systems using transparent system interrupt has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a computer system, a computer implemented method for providing system security to the computer system, the method comprising the steps of:
   a) operating a processor of the computer system in a first state and keyboard control facility of the computer system in a first mode, allowing commands and data to be freely exchanged between the processor and a keyboard of the computer system in a substantially unrestricted manner, except for a first plurality of system security related commands and data;
   b) operating the processor in a second state and the keyboard control facility in a second mode in response to the presence of the first system security related command and data while the processor is operating in the first state and the keyboard control facility is operating in the first mode, wherein the keyboard control facility communicates exclusively with a transparent system management interrupt (SMI) handler, facilitating servicing of the first system security related commands and data by the SMI handler, and inhibiting all exchange of commands and data between the processor and the keyboard.

2. The method as set forth in claim 1, wherein
   the method further comprises the step of (c) operating the processor in the first state and the keyboard control facility in a third mode, substantially inhibiting exchange of commands and data between the processor and the keyboard, except for a second plurality of system security related commands and data;
   step (b) further comprises operating the processor in the second state and the keyboard controlling facility in the second mode in response to the presence of the second commands and data while the processor is operating in the first state and the keyboard controlling facility is operating in the third mode, wherein the keyboard controlling facility also communicates exclusively with the transparent system management interrupt (SMI) handler, facilitating servicing of the second system security related commands and data by the SMI handler, and inhibiting exchange of commands and data between the processor and the keyboard.

3. In a computer system, a computer implemented method for providing system security to the computer system, the method comprising the steps of:

a) operating a processor of the computer system in a first state and keyboard control facility of the computer system in a first mode, substantially inhibiting commands and data to be exchanged between the processor and a keyboard of the computer system, except for a first plurality of system security related commands and data;

b) operating the processor in a second state and the keyboard control facility in a second mode in response to the presence of the first system security related command and data while the processor is operating in the first state and the keyboard control facility is operating in the first mode, wherein the keyboard control facility communicates exclusively with a transparent system management interrupt (SMI) handler, facilitating servicing of the first system security related commands and data by the SMI handler, inhibiting exchange of commands and data between the processor and the keyboard.

4. An apparatus comprising keyboard controlling facility that operates in one of three modes in any point in time during operation, the three modes including a first mode wherein commands and data are allowed to be exchanged between a coupled keyboard/auxiliary device and a coupled processor operating in a first state through the keyboard controlling facility in a substantially unrestricted manner, except for a first plurality of security related commands and data, a second mode wherein commands and data exchanges between the processor operating in the first state and the keyboard/auxiliary device through the keyboard controlling facility are substantially inhibited, except for a second plurality of security related commands and data; and a third mode wherein the keyboard controlling facilitating communicates exclusively with the processor operating in a second state, facilitating servicing of either the first or the second security related commands and data, and inhibiting all command and data exchanges between the processor and the keyboard/auxiliary device.

5. The apparatus as set forth in claim 4, wherein the keyboard controlling facility includes logic for unconditionally channeling data received from the keyboard/auxiliary device to the processor, except for a plurality of predetermined key sequences from the keyboard/auxiliary device, while the processor is operating in the first state and the keyboard controlling facility is operating in the first mode.

6. The apparatus as set forth in claim 5, wherein the keyboard controlling facility includes logic for transitioning into and operating the keyboard controlling facility in the third mode, in response to one of the predetermined key sequences from the keyboard/auxiliary device, while the processor is operating in the first state and the keyboard controlling facility is operating in the first mode.

7. The apparatus as set forth in claim 6, wherein the predetermined key sequences include a predetermined key sequence denoting a user's desire for a system comprising the processor to be secured.

8. The apparatus as set forth in claim 4, wherein the keyboard controlling facility includes logic for unconditionally responding to commands from the processor directed towards the keyboard controlling facility and unconditionally channeling data received from the processor to the keyboard/auxiliary device, except for a plurality of predetermined commands from the processor that are directed towards the keyboard controlling facility, while the processor is operating in the first state and the keyboard controlling facility is operating in the first mode.

9. The apparatus as set forth in claim 8, wherein the keyboard controlling facility includes logic for conditionally performing zero or at least one pre-transition operation depending on the command, and then transitioning into and operating the keyboard controller in the third mode, in response to one of the predetermined commands from the processor, while the processor is operating in the first state and the keyboard controlling facility in the first mode.

10. The apparatus as set forth in claim 9, wherein the predetermined commands include a command instructing the keyboard controlling facility to download a password from a non-volatile memory into the keyboard controlling facility, the keyboard controlling facility downloading the password before transitioning into and operating the keyboard controlling facility in the third mode.

11. The apparatus as set forth in claim 9, wherein the predetermined commands include a command instructing the keyboard controlling facility to enter the second mode, the keyboard controlling facility transitioning into and operating the keyboard controlling facility in the third mode, without performing any pre-transition operations.

12. The apparatus as set forth in claim 4, wherein the keyboard controlling facility includes logic for conditionally channeling data received from the keyboard device to the processor if the data are expected responses from the keyboard, while the processor is operating in the first state and the keyboard controlling facility is operating in the second mode.

13. The apparatus as set forth in claim 12, wherein the keyboard controlling facility includes logic for transitioning into and operating the keyboard controlling facility in the third mode, in response to unexpected data received from the keyboard, while the processor is operating in the first state and the keyboard controlling facility is operating in the second mode.

14. The apparatus as set forth in claim 4, wherein the keyboard controlling facility includes logic for unconditionally responding to commands from the processor directed towards the keyboard controlling facility and unconditionally channeling data received from the processor to the keyboard, while the processor is operating in the first state and the keyboard controlling facility is operating in the second mode.

15. The apparatus as set forth in claim 4, wherein the keyboard controlling facility includes logic for uploading a password to the processor, in response to a command from the processor, while the processor is operating in the second state and the keyboard controlling facility is operating in the third mode.

16. The apparatus as set forth in claim 4, wherein the keyboard controlling facility includes logic for transitioning into and operating the keyboard controlling facility in either the first or the second mode, in response to a command from the processor, while the processor is operating in the second state and the keyboard controlling facility is operating in the third mode.

17. An apparatus comprising:

a processor having a first and a second state of operation, an interrupt for switching the processor from the first state to the second state, and an instruction for returning the processor to the first state from the second state;

keyboard controlling facility that operates in a one of three modes in any point in time during operation, the three modes including a first mode wherein commands and data are allowed to be exchanged between a coupled keyboard/auxiliary device and the processor operating in the first state through the keyboard controlling facility in a substantially unrestricted manner, except for a first plurality of security related commands and data, a second mode wherein commands and data exchanges between the processor operating in the first state and the keyboard/auxiliary device through the keyboard controlling facility are substantially inhibited, except for a second plurality of security related commands and data, and a third mode wherein the keyboard controlling facilitating communicates exclusively with the processor operating in a second state, facilitating servicing of either the first or the second security related commands and data, and inhibiting all command and data exchanges between the processor and the keyboard/auxiliary device; and an interrupt handler executed by the processor in the second state for servicing the first or the second security related commands and data.

18. The apparatus as set forth in claim 17, wherein the keyboard controlling facility includes logic for establishing exclusive communication with the interrupt handler to operate the keyboard controlling facility in the third mode by triggering the interrupt, when transitioning from either the first or the second mode to the third mode; and the keyboard controlling facility further includes logic for providing the interrupt handler with a reason for triggering the interrupt.

19. The apparatus as set forth in claim 18, wherein the interrupt handler includes logic for instructing the keyboard controlling facility to upload a password, and upon receiving and saving the password, instructing the keyboard controlling facility to operate in the first mode, in response to a triggering reason, the triggering reason being the keyboard controlling facility having received a command to download a password from the processor.

20. The apparatus as set forth in claim 18, wherein the interrupt handler includes logic for instructing the keyboard controlling facility to operate in the second mode, in response to a triggering reason, the triggering reason being the keyboard controlling facility having received a command to activate security from the processor.

21. The apparatus as set forth in claim 18, wherein the interrupt handler includes logic for updating a running sequence of unexpected data received from the keyboard, and conditionally instructing the keyboard controlling facility to operate in either the first or the second mode depending on whether a required password has been entered, in response to a triggering reason, the triggering reason being the keyboard controlling facility having received unexpected data from the keyboard.

22. A keyboard controller comprising controlling firmware that operates in one of three modes in any point in time during operation, the three modes including a first mode wherein commands and data are allowed to be exchanged between a coupled keyboard/auxiliary device and a coupled processor operating in a first state through the keyboard controller in a substantially unrestricted manner, except for a first plurality of security related commands and data, a second mode wherein commands and data exchanges between the processor operating in the first state and the keyboard/auxiliary device through the keyboard controller are substantially inhibited, except for a second plurality of security related commands and data; and a third mode wherein the keyboard controller communicates exclusively with the processor operating in a second state, facilitating servicing of either the first or the second security related commands and data, and inhibiting all command and data exchanges between the processor and the keyboard/auxiliary device.

23. A computer motherboard comprising:

a processor having a first and a second state of operation, an interrupt for switching the processor from the first state to the second state, and an instruction for returning the processor to the first state from the second state;

keyboard controlling facility wherein said keyboard controlling facility includes a virtual keyboard controller that operates in one of three modes in any point in time during operation, the three modes including a first mode wherein commands and data are allowed to be exchanged between a coupled keyboard/auxiliary device and the processor operating in the first state through the keyboard controlling facility in a substantially unrestricted manner, except for a first plurality of security related commands and data, a second mode wherein commands and data exchanges between the processor operating in the first state and the keyboard/auxiliary device through the keyboard controlling facility are substantially inhibited, except for a second plurality of security related commands and data, and a third mode wherein the keyboard controlling facilitating communicates exclusively with the processor operating in a second state, facilitating servicing of either the first or the second security related commands and data, and inhibiting all command and data exchanges between the processor and the keyboard/auxiliary device; and an interrupt handler executed by the processor in the second state for servicing the first or the second security related commands and data.

24. A computer motherboard comprising:

a processor having a first and a second state of operation, an interrupt for switching the processor from the first state to the second state, and an instruction for returning the processor to the first state from the second state;

a keyboard controller that operates in one of three modes in any point in time during operation, the three modes including a first mode wherein commands and data are allowed to be exchanged between a coupled keyboard/auxiliary device and the processor operating in the first state through the keyboard controller in a substantially unrestricted manner, except for a first plurality of security related commands and data, a second mode wherein commands and data exchanges between the processor operating in the first state and the keyboard/auxiliary device through the keyboard controller are substantially inhibited, except for a second plurality of security related commands and data, and a third mode wherein the keyboard controller communicates exclusively with the processor operating in a second state, facilitating servicing of either the first or the second security related commands and data, and inhibiting all command and data exchanges between the processor and the keyboard/auxiliary device; and an interrupt handler executed by the processor in the second state for servicing the first or the second security related commands and data.

25. A computer system comprising:

a processor having a first and a second state of operation, an interrupt for switching the processor from the first state to the second state, and an instruction for returning the processor to the first state from the second state;

a keyboard including an auxiliary device for inputting control signals/data;

keyboard controlling facility that operates in one of three modes in any point in time during operation, the three modes including a first mode wherein commands and data are allowed to be exchanged between the keyboard/auxiliary device and the processor operating in the first state through the keyboard controlling facility in a substantially unrestricted manner, except for a first plurality of security related commands and data, a second mode wherein commands and data exchanges between the processor operating in the first state and the keyboard/auxiliary device through the keyboard controlling facility are substantially inhibited, except for a second plurality of security related commands and data, and a third mode wherein the keyboard controlling facilitating communicates exclusively with the processor operating in a second state, facilitating servicing of either the first or the second security related commands and data, and inhibiting all command and data exchanges between the processor and the keyboard/auxiliary device; and an interrupt handler executed by the processor in the second state for servicing the first or the second security related commands and data.

\* \* \* \* \*